United States Patent
Bach et al.

(10) Patent No.: US 7,003,058 B2
(45) Date of Patent: Feb. 21, 2006

(54) POLARIZATION DIVISION DUPLEXING WITH CROSS POLARIZATION INTERFERENCE CANCELLER

(75) Inventors: Susan E. Bach, Redondo Beach, CA (US); Kurt W. Loheit, Rancho Palos Verdes, CA (US); Remy O. Hiramoto, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 766 days.

(21) Appl. No.: 10/086,127

(22) Filed: Feb. 27, 2002

(65) Prior Publication Data

US 2003/0161419 A1 Aug. 28, 2003

(51) Int. Cl.
*H04D 1/04* (2006.01)
*H03D 1/06* (2006.01)
*H03K 5/01* (2006.01)
*H04B 1/10* (2006.01)
*H04L 1/00* (2006.01)

(52) U.S. Cl. ..................... 375/346; 356/453
(58) Field of Classification Search ............... 375/346; 356/453
See application file for complete search history.

(56) References Cited

U.S. PATENT DOCUMENTS

| | | | |
|---|---|---|---|
| 5,463,355 A | | 10/1995 | Halloran |
| 5,495,502 A | * | 2/1996 | Andersen .................... 375/235 |
| 5,608,722 A | | 3/1997 | Miller |
| 5,680,395 A | * | 10/1997 | Weaver et al. ............... 370/331 |
| 5,754,961 A | | 5/1998 | Serizawa et al. |
| 5,844,950 A | * | 12/1998 | Aono et al. .................. 375/346 |
| 5,872,540 A | * | 2/1999 | Casabona et al. ........... 342/362 |
| 5,905,574 A | | 5/1999 | Vollbrecht et al. |
| 6,006,072 A | * | 12/1999 | Tsujimoto ................... 455/63.1 |
| 6,167,095 A | | 12/2000 | Furukawa et al. |
| 6,430,391 B1 | * | 8/2002 | Dent et al. .................. 455/11.1 |
| 6,597,678 B1 | * | 7/2003 | Kuwahara et al. .......... 370/342 |
| 6,611,231 B1 | * | 8/2003 | Crilly et al. ................. 342/378 |
| 2002/0165002 A1 | * | 11/2002 | Kolinko et al. .............. 455/500 |
| 2002/0167449 A1 | * | 11/2002 | Frazita et al. ............... 343/756 |
| 2002/0177405 A1 | * | 11/2002 | Chedester et al. ............ 455/39 |

* cited by examiner

*Primary Examiner*—Stephen Chin
*Assistant Examiner*—Jia Iu
(74) *Attorney, Agent, or Firm*—Shimokaji & Associates, P.C.

(57) ABSTRACT

A telecommunication system includes a transmitter configured to modulate a forward link RF carrier with a first set of data; a receiver configured to demodulate a second set of data from a return link RF carrier; an orthomode transducer having two linear ports and a circular waveguide port, where one of the linear ports is connected as an input from the transmitter and another linear port is simultaneously connected as an output to the receiver; an antenna; and a linear-to-circular polarizer connected to the circular waveguide port and connected to the antenna, where the linear-to-circular polarizer is configured so that a first linear polarization at the circular waveguide port results in a first circular polarization at the antenna and a second circular polarization at the antenna results in a second linear polarization at the circular waveguide port.

27 Claims, 4 Drawing Sheets

POLARIZATION DIVISION DUPLEXING WITH CROSS POLARIZATION INTERFERENCE CANCELLER

BACKGROUND OF THE INVENTION

The present invention generally relates to point-to-point high frequency, high data rate wireless telecommunication systems and, more particularly, to band efficient communications using polarization division duplexing.

There is an increasing need for very high data rates, over 300 Mbps (megabits per second), in wireless telecommunication systems. High data transmission rates are needed, for example, in backhaul networks, LMDS (local multipoint distribution service), MMDS (multichannel or microwave multipoint distribution service), dedicated links in campus networks, private communication networks, and high speed internet services such as cable modems and DSL (digital subscriber line). In areas without gas or steam pipes or other underground conduits, it is less costly to set up wireless transceivers on rooftops than to dig up the ground to install optical fiber. Installation of a wireless link requires only the placement of antennas and associated equipment at the desired locations and can be completed and functional within a day as opposed to the several days, or longer, required to install a hardwired system. There may be additional advantages if the antenna and hardware that comprise a terminal are made small enough in size to be mobile for use in temporary setups supporting special events such as sporting events or concerts. Thus, there is increasing demand for high performance, high data rate links to support system architectures transmitting at OC-3 (optical carrier 3, with a data rate of 155 Mbps) to OC-96 (4.9 Gbps, or gigabits per second). Current wireless systems supporting high data rate networks achieve up to approximately 600 Mbps (OC-12).

Capability of current wireless systems is limited due to smaller channel bandwidth allocations, typically less than 100 MHz (mega hertz, or million cycles per second), available in the Federal Communications Commission (FCC) allocated frequency bands in the range of 1 to 40 GHz. One approach to providing increased data rates is to use a higher frequency range, for example, 70 to 100 GHz, where there is currently much lower usage and, therefore, potential availability for wider channel bandwidth allocations. Even at higher frequencies and with wider channel bandwidth allocations, however, there still exist economic, technical, and other incentives to make the most efficient use of the allocated channel bandwidth because, for example, of the limited availability of such channel bandwidth allocations, their licensing cost, and operating costs to use them. As an example, one way to achieve higher data rates within a given channel bandwidth allocation, is to use modulation schemes that are more bandwidth efficient, by increasing the modulation order, which allows higher data rates to be used. Achieving more bandwidth-efficient modulation presents several technical challenges, however, and typically requires more complex and expensive hardware.

Frequency reuse schemes are another approach to achieving greater bandwidth efficiency. In a frequency reuse scheme, different signals may be transmitted over the same frequencies. In order to be able to separate the different signals from each other, the signals are made orthogonal—thus seperable—by the use, for example, of techniques such as polarization, code division multiplexing, or time division multiplexing. The frequency reuse approach can effectively increase data rates by transmitting more data on separated signals over the same frequencies.

One example of frequency reuse in current radio frequency (RF) wireless communication systems is the use of linear polarization of the RF carrier signal waveforms. When using linear polarization for frequency reuse, the varying electromagnetic fields of the RF carrier signal waveforms are transmitted in two orthogonal planes of polarization, which typically may be oriented in the vertical or horizontal directions. Then, for example, one set of data may be transmitted in a horizontal plane of polarization while a second, independent set of data is transmitted over the same RF carrier frequency in a vertical plane of polarization. By the implementation of such a frequency reuse scheme using linear polarization, the amount of data that can be communicated in a given bandwidth may be potentially doubled without otherwise increasing the data rate or changing the modulation scheme. In this example using linear polarization for frequency reuse, the receiving antennas convert the varying electromagnetic fields of the RF carriers to electronic waveforms. In order for the conversions to be accurate, linear polarization requires close alignment of the axes of the transmit and receive antennas to match the plane of polarization. Any unintentional rotation of one antenna with respect to the other may result in significant received power losses. Another problem in frequency reuse schemes using polarization is attenuation and depolarization due to the transmission of the signals through rain or other atmospheric conditions.

Another example of frequency reuse in current radio frequency (RF) wireless communication systems is the use of circular polarization of the RF carrier signal waveforms. When using circular polarization for frequency reuse, the varying electromagnetic fields, or waves, of the RF carrier signal are excited and transmitted with components in two orthogonal coordinates where, for example, one coordinate may be horizontal and the other may be vertical. The orthogonal components are combined so that the combinations will produce an electromagnetic wave that rotates circularly as the RF carrier signal propagates. Depending on the direction of rotation of the circularly rotating electromagnetic wave, either a right-hand circular polarization (RHCP) or a left-hand circular polarization (LHCP) is produced. Then, for example, one set of data may be transmitted using LHCP while a second, independent set of data is transmitted over the same RF carrier frequency using RHCP. By the implementation of such a frequency reuse scheme using circular polarization, the amount of data that can be communicated in a given bandwidth may be potentially doubled without changing the data rate or the modulation scheme. Axial alignment of the antennas, i.e. pointing the antennas directly at each other, improves received power, but unlike linear polarization, circular polarization does not require rotational, or radial, alignment of the polarization axes of the transmit and receive antennas to match a plane of polarization, so that rotation of one antenna with respect to the other does not affect received power.

U.S Pat. No. 5,905,574, issued May 18, 1999, entitled "Method and Apparatus for Canceling Cross Polarization Interference", and assigned to the assignee of the present invention, describes a system for dual signal transmission with a circular polarization frequency reuse scheme transmitting two RF carrier signals at the same frequency propagating in the same direction, one signal using RHCP and the other signal using LHCP. The circular polarization frequency reuse scheme introduces interference between the two RF carrier signals due to cross-polarization coupling of the two RF carrier signals. In order to reduce this cross-polarization coupling, an adaptive interference reduction circuit may be integrated into the circular polarization frequency reuse scheme. U.S. Pat. No. 5,905,574 does not disclose a full duplex system, i.e., a system for two-way communication; the adaptive interference reduction circuit integrated into the circular polarization frequency reuse scheme enhances communication in one direction only.

Frequency division duplexing (FDD) is the most common method of sending and receiving a full duplex signal, i.e., communicating in two directions simultaneously. FDD distinguishes between transmit and receive signals by placing them on two different frequencies. The antenna will transmit a signal on one frequency and receive another signal on a different frequency. The FDD full duplex method could require, for example, twice as much bandwidth as single duplex communication because forward transmission occurs on one channel, using a certain amount of bandwidth, and return transmission occurs on another channel, using additional bandwidth. For a telecommunication system that transmits and receives the same amount of data at similar data rates, two channels of approximately the same bandwidth are needed.

By implementing a full duplex system using a frequency reuse scheme, significant gains in channel bandwidth economy may be achieved. For example, a full duplex system, i.e., a system for two-way communication, might be implemented over a single center frequency, or channel, by transmitting a forward link on one polarization and a return link on another, orthogonal, polarization. Circular polarization has several clear advantages over linear polarization for the implementation of such a frequency reuse scheme. For example, circular polarization is less susceptible than linear polarization to interference and depolarization due to the transmission of the signals through rain or other atmospheric conditions. Also, rotational misalignment of the antennas is less a problem with circular polarization than with linear polarization, as described above. There is an interference problem with circular polarization, however, due to reflections of the circularly polarized electromagnetic waves returning to the transmit/receive antenna on the opposite polarization. Electromagnetic waves may be reflected, for example, from the surfaces of buildings or from foliage. If an RHCP electromagnetic wave is reflected it will be reflected as an LHCP electromagnetic wave, and vice versa. So, for example, if RHCP signals are being transmitted and LHCP signals are being received, a reflected RHCP transmit signal returns as LHCP as a result of being reflected so that it interferes with the LHCP receive signal. Thus, the transmit signal would undesirably interfere with the receive signal at the transmitter/receiver.

As can be seen, there is a need for a full duplex telecommunication system that effectively takes advantage of frequency reuse using circular polarization. There is also a need for a mechanism that will detect whether or not a circularly polarized electromagnetic wave being received is in fact the proper signal coming into the receiver or an undesirable reflection of an electromagnetic wave transmitted from the same site on the opposite circular polarization.

SUMMARY OF THE INVENTION

The present invention provides a full duplex telecommunication system that effectively takes advantage of frequency reuse using circular polarization. The present invention also provides a mechanism that will detect whether or not a circularly polarized electromagnetic wave being received is in fact the proper signal coming into the receiver or an undesirable reflection of an electromagnetic wave transmitted from the same site on the opposite circular polarization.

In one aspect of the present invention, a telecommunication system includes a transmitter at a site configured to modulate a forward link RF carrier with a first set of data; a receiver at the same site configured to demodulate a second set of data from a return link RF carrier; an orthomode transducer having two linear ports and a circular waveguide port, where one of the linear ports is connected as an input from the transmitter and another linear port is simultaneously connected as an output to the receiver; an antenna; and a linear-to-circular polarizer connected to the circular waveguide port and connected to the antenna, where the linear-to-circular polarizer is configured so that a first linear polarization at the circular waveguide port results in a first circular polarization at the antenna and a second circular polarization at the antenna results in a second linear polarization at the circular waveguide port.

In another aspect of the present invention, a cross polarization interference canceller includes a transmit splitter for splitting the transmit signal between the forward link and the cross polarization interference canceller; a receive splitter adapted for splitting the receive signal from the return link; an interference detector connected to the transmit splitter and connected to the receive splitter and configured to correlate the transmit signal and the receive signal and to output an interference amplitude and interference phase of interference with the receive signal due to the transmit signal; a vector modulator controller configured to use the output of the interference detector to calculate new vector modulator settings; a vector modulator connected to the transmit splitter and connected to the vector modulator controller, the vector modulator configured to use the transmit signal from the transmit splitter and the new vector modulator settings from the vector modulator controller to form an interference cancellation vector; and a summer connected to the vector modulator and connected to the receive splitter, where the summer is configured to form a clean receive signal by adding the interference cancellation vector from the vector modulator to the receive signal from the receive splitter, and provide the clean receive signal to the receiver.

In still another aspect of the present invention, a telecommunication system includes a transmitter configured to modulate a first RF carrier with a first set of data to form a transmit signal; a receiver configured to demodulate a second set of data from a second RF carrier forming a receive signal; an orthomode transducer having at least two linear ports and a circular waveguide port, one of the linear ports being connected as an input from the transmitter and another of the linear ports simultaneously connected as an output to the receiver; an antenna; a linear-to-circular polarizer connected to the circular waveguide port and connected to the antenna, where the linear-to-circular polarizer is configured so that a first linear polarization at the circular waveguide port results in a first circular polarization at the antenna and a second circular polarization at the antenna results in a second linear polarization at the circular waveguide port; and a cross polarization interference canceller.

The cross polarization interference canceller includes a transmit splitter adapted for splitting the transmit signal between the orthomode transducer and the cross polarization interference canceller; a receive splitter adapted for splitting the receive signal from the orthomode transducer; an interference detector connected to the transmit splitter and connected to the receive splitter where the interference detector is configured to correlate the transmit signal and the receive signal and to output an interference amplitude and interference phase of interference with the receive signal due to the transmit signal; a vector modulator controller configured to use the output of the interference detector to calculate new vector modulator settings; a vector modulator connected to the transmit splitter and connected to the vector modulator controller, where the vector modulator is configured to use the transmit signal from the transmit splitter and the new vector modulator settings from the vector modulator controller to form an interference cancellation vector, where the interference cancellation vector substantially cancels interference on the receive signal from the transmit signal when the interference cancellation vector is added to the receive signal; and a summer connected to the vector modulator and connected to the receive splitter, where the summer is configured to form a clean receive signal by adding the interference cancellation vector from the vector modulator to the receive signal from the receive splitter, and provide the clean receive signal to the receiver.

In a further aspect of the present invention, a method comprises steps of: modulating a first RF carrier with a first set of data to form a transmit signal using a transmitter; demodulating a second set of data from a second RF carrier forming a receive signal, using a receiver; simultaneously using one linear port of an orthomode transducer, having at least two linear ports, as an input from the transmitter and another linear port of the orthomode transducer as an output to the receiver while using a circular waveguide port of the orthomode transducer as input and output to a channel; converting a first linear polarization at the circular waveguide port to a first circular polarization in the channel and converting a second circular polarization in the channel to a second linear polarization at the circular waveguide port; splitting the transmit signal between the orthomode transducer and a cross polarization interference canceller; splitting the receive signal from the orthomode transducer; feeding the transmit signal and the receive signal to an interference detector and using the interference detector to correlate the transmit signal and the receive signal to determine an interference with the receive signal due to the transmit signal and to output an interference amplitude and interference phase of the interference; inputting the interference amplitude and interference phase to a vector modulator controller to calculate new vector modulator settings; supplying the new vector modulator settings to a vector modulator and using the transmit signal and the new vector modulator settings from the vector modulator controller to form an interference cancellation vector, where the interference cancellation vector substantially cancels interference with the receive signal due to the transmit signal when the interference cancellation vector is added to the receive signal; using a summer to add the interference cancellation vector from the vector modulator to the receive signal to form a clean receive signal; and providing the clean receive signal to the receiver so that cross polarization interference is substantially cancelled.

These and other features, aspects and advantages of the present invention will become better understood with reference to the following drawings, description and claims.

DETAILED DESCRIPTION OF THE INVENTION

Figure 1:
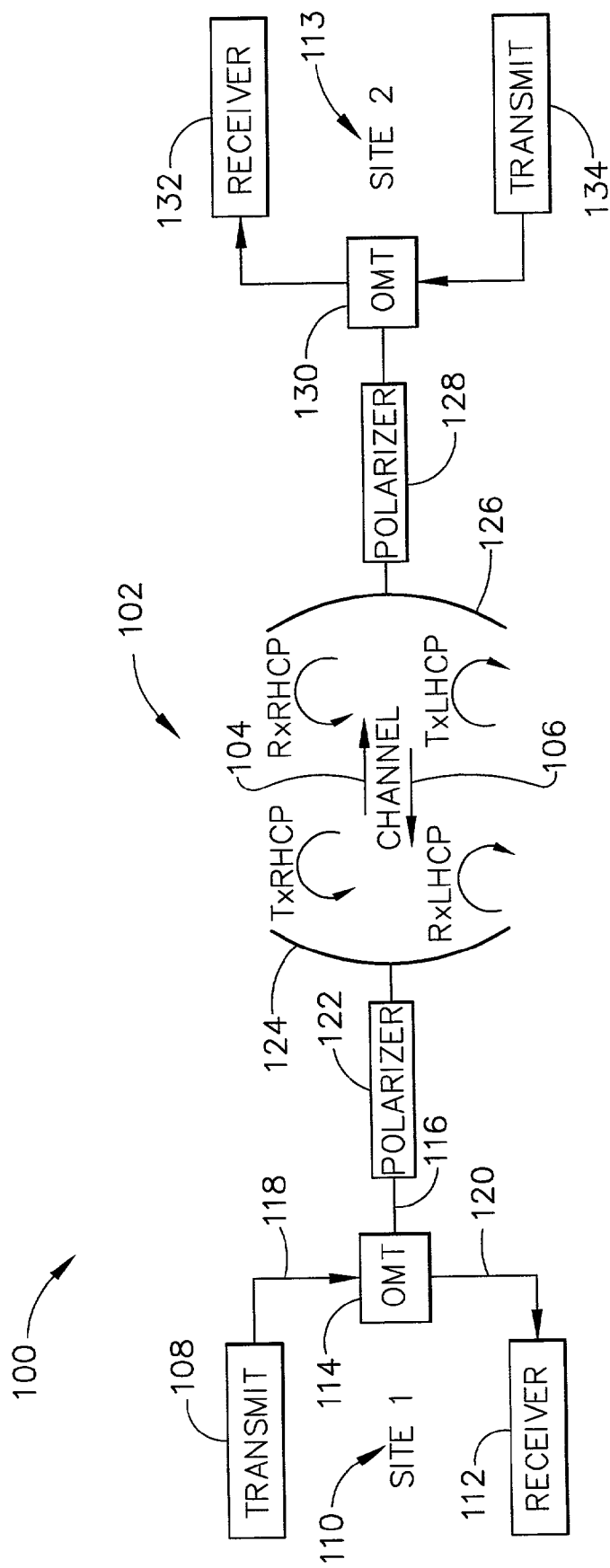
FIG. 1 is a block diagram of a full duplex telecommunication system using polarization division duplexing (PDD) according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a full duplex telecommunication system that effectively takes advantage of frequency reuse using circular polarization. One embodiment of the present invention takes advantage of frequency reuse by implementing polarization division duplexing (PDD) for a full duplex wireless telecommunication system. Polarization division duplexing according to one embodiment uses opposite circular polarizations for forward and return links to separate transmit and receive signals at each site, for example, by transmitting a forward link on one circular polarization and receiving the return link on the opposite polarization at a site. According to one embodiment, the polarization division duplexing method will isolate the desired circular polarization at the receive end of each link in the full duplex wireless telecommunication system. By transmitting two independent sets of data at one carrier frequency on orthogonal, or opposite, circular polarizations, the PDD of one embodiment effectively doubles the amount of data that can be communicated in a given bandwidth compared to the frequency division duplexing (FDD) systems of the prior art. The PDD method of one embodiment allows high data rates to be used which make full use of the allocated channel bandwidth because data is being sent both ways on the same bandwidth. Thus, the PDD method of the present invention contributes to more efficient use of the allocated channel bandwidth by decreasing the channel separation margins required for the FDD of the prior art.

As noted above, U.S. Pat. No. 5,905,574 discloses the use of cross-polarization interference canceller for a dual polarization system that sends two signals in the same direction. In a dual polarization system, such as that disclosed in the prior art, the receiver is receiving two signals and must decipher between the two signals so that the correct signal goes into the proper receiver without interference from the other signal. The dual polarization system of the prior art does not describe a full duplex system with two signals at the same frequency propagating in opposite directions with one signal using RHCP and the other using LHCP to achieve maximum bandwidth efficiency as in the present invention where the receiver is picking up only one signal.

The present invention also provides a mechanism that will detect whether or not a circularly polarized electromagnetic wave being received is in fact the proper signal coming into the receiver or an undesirable reflection of an electromagnetic wave transmitted from the same site on the opposite circular polarization. In one embodiment, a cross-polarization interference canceller (CPIC) may be used to cancel out the transmitted signal to prevent it from interfering with proper detection of the received signal in the receiver at the same site. The cross polarization interference canceller may be used to measure and cancel the cross-polarization interference on a wideband frequency reuse channel. According to an embodiment, measurement and corrections are performed at radio frequency (RF), and no demodulation is required for operation. Therefore the operations of the cross-polarization interference canceller are independent of data rate, modulation type, error correction coding, data format, carrier, and frequency, which provides many advantages including generally facilitating implementation of the PDD method of the present invention.

Referring now to FIG. 1, a block diagram is used to illustrate one example of a full duplex telecommunication system 100 using polarization division duplexing according to one embodiment. Telecommunication system 100 is adapted to transmit two independent sets of data in opposite directions over channel 102, which, for example, may comprise RF electromagnetic radiation in a Federal Communications Commission (FCC) allocated channel bandwidth.

Channel 102 may be used to transmit a forward link 104 on one circular polarization and receive a return link 106, which may also be referred to as a reverse link, on the opposite circular polarization. In the example embodiment illustrated in FIG. 1, right-hand circular polarization (RHCP) is used on forward link 104, and left-hand circular polarization (LHCP) is used on return link 106. As seen in FIG. 1, telecommunication system 100 can be symmetric so the assignment of polarizations to links could be reversed without affecting the functioning of telecommunication system 100, and the same remarks apply to other examples and figures in the present application whenever a specific polarization is used to illustrate an example.

Telecommunication system 100 can include transmitter 108 at a first site 110, referred to as Site 1, as shown in FIG. 1. Transmitter 108 may be configured to modulate an RF carrier with a first set of data for communication from Site 1 over forward link 104. Telecommunication system 100 can further include receiver 112 configured to demodulate, or detect, a second set of data, which is independent of the first set of data, communicated over return link 106 from a second site 113, referred to as Site 2, as shown in FIG. 1.

Telecommunication system 100 may also include orthomode transducer (OMT) 114. OMT 114 may be used to separate a signal applied to its circular waveguide port 116 into vertical and horizontal components at its two linear ports 118 and 120. In reverse, two orthogonal linearly-polarized signals from linear ports 118 and 120 can be combined to appear at the circular waveguide port 116. The resultant polarization of the signal at circular waveguide port 116 will be linear, circular or elliptical depending on the relative phase and amplitude of the two orthogonal input signals from linear ports 118 and 120. OMT linear port 118 may only allow vertical or horizontal polarizations through the port while the OMT linear port 120 may only allow the opposite polarization of linear port 118 through the port. In the present example used to illustrate one embodiment shown in FIG. 1, linear port 118 may be a vertical polarization port and linear port 120 may be a horizontal polarization port. Circular waveguide port 116 can be a port that does not distinguish between horizontal and vertical polarizations. Circular waveguide port 116 can allow both transmit and receive signals, i.e. both forward link 104 and return link 106 signals, through the port.

Telecommunication system 100 can further include linear-to-circular polarizer 122. Linear-to-circular polarizer 122 may be used to convert signal waveforms between linearly-polarized signals at circular waveguide port 116 and either right- or left-handed circularly polarized signals at antenna 124. In the present example used to illustrate one embodiment shown in FIG. 1, full duplex antenna 124 can transmit RHCP signals from Site 1 over forward link 104 and receive LHCP signals from Site 2 over return link 106. Thus, in the present example, linear-to-circular polarizer 122 may be set up so that vertical polarization at circular waveguide port 116 can result in RHCP at antenna 124 and LHCP at antenna 124 can result in horizontal polarization at circular waveguide port 116. In other embodiments, telecommunication system 100 may also be operated with linear-to-circular polarizer 122 set up to correspond vertical polarization to LHCP and horizontal polarization to RHCP, as will be apparent to persons of ordinary skill in the art.

In telecommunication system 100, OMT 114, together with linear-to-circular polarizer 122 and antenna 124, can be used to convert the signal transmitted from Site 1 to RHCP, and simultaneously route the LHCP signal from Site 2 to Site 1 receiver 112. OMT 114 is thus used in a non-conventional manner, simultaneously using one linear port as an input and the other linear port as an output, to achieve the polarization division duplexing frequency reuse of telecommunication system 100.

As shown in FIG. 1, telecommunication system 100 may also include antenna 126, linear-to-circular polarizer 128, OMT 130, receiver 132, and transmitter 134 at Site 2, which function, respectively, as their corresponding modules at Site 1. Telecommunication system 100 may thus achieve a full duplex system with RHCP and LHCP signals being transmitted in opposite directions on the same channel 102. Full duplex communication is achieved with frequency re-use using PDD by placing the transmit and receive signals on opposite circular polarizations. As described above, circular polarization does not require rotational, or radial, alignment of the polarization axes of the transmit and receive antennas to match a plane of polarization, so that there may be less problem of losses in received power due to antenna rotational misalignment.

Figure 2:
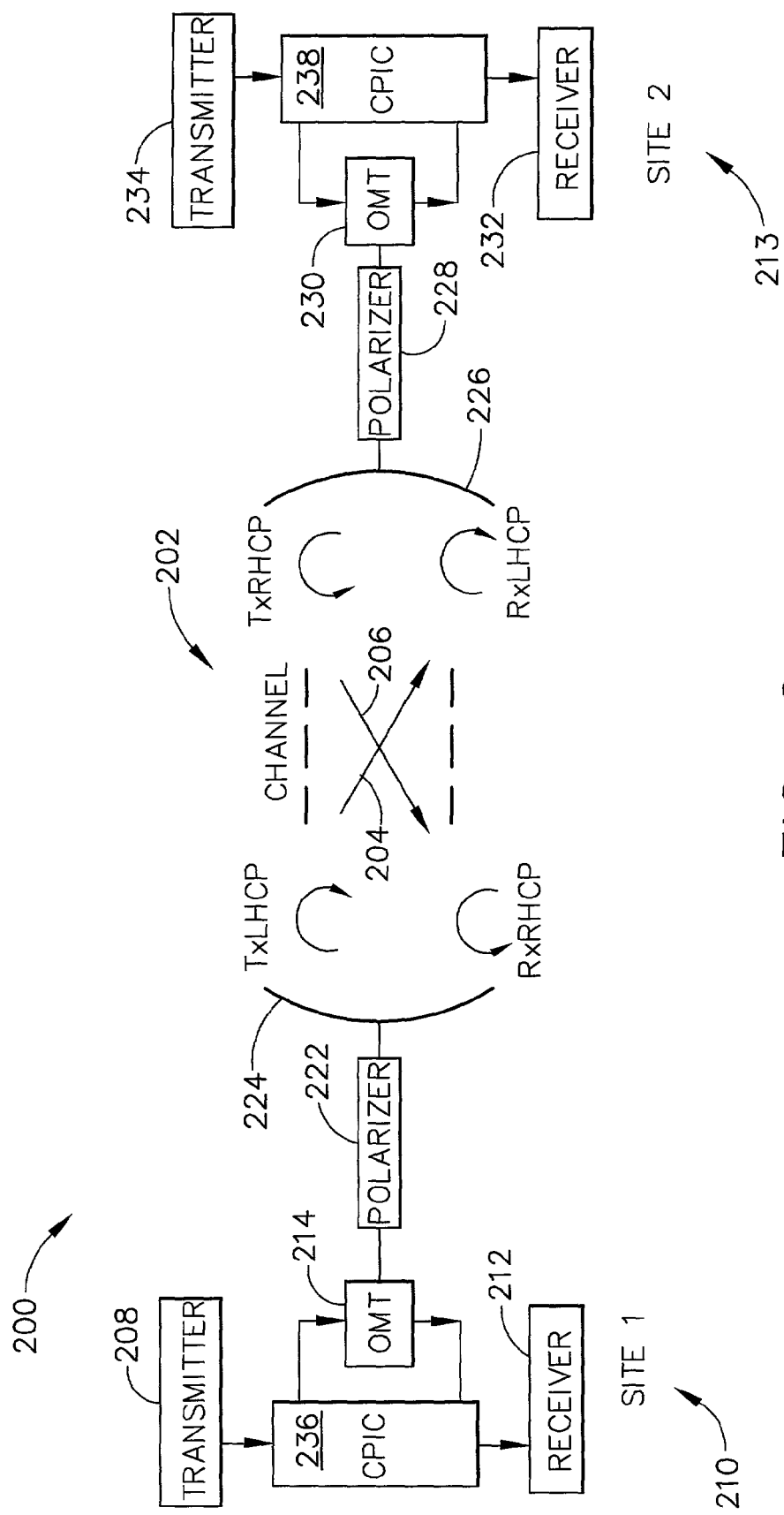
FIG. 2 is a block diagram of a full duplex telecommunication system using PDD including a cross-polarization interference canceller (CPIC) according to one embodiment of the present invention.
Figure 3:
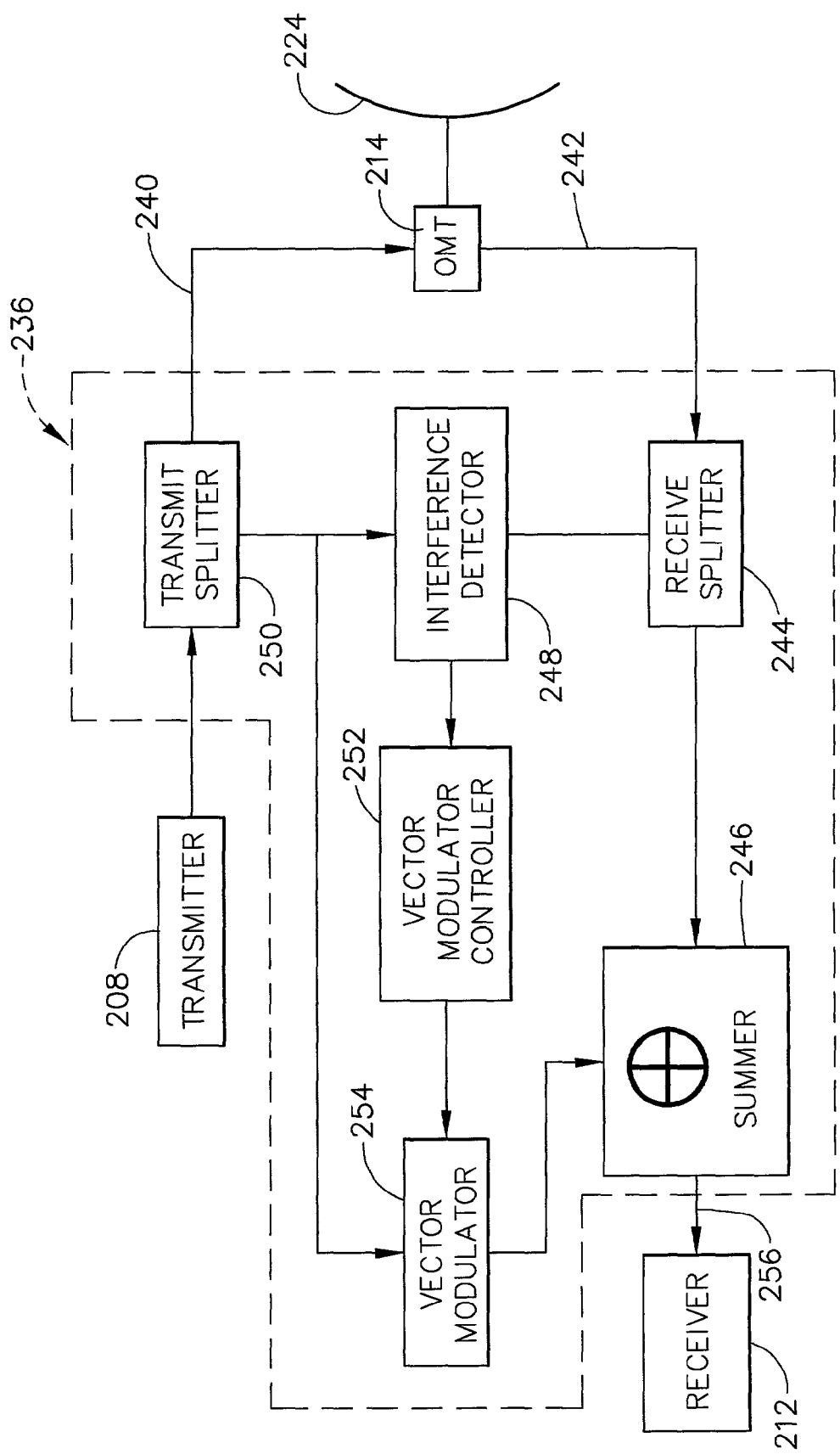
FIG. 3 is a block diagram of a cross-polarization interference canceller connected in a full duplex telecommunication system using PDD according to one embodiment of the present invention.

Referring now to FIGS. 2 and 3, an example of a full duplex telecommunication system 200 using PDD is illustrated using block diagrams. Telecommunication system 200 may include cross-polarization interference cancellers (CPIC) 236 and 238 according to one embodiment of the present invention.

As shown in FIG. 2, telecommunication system 200 may also include transmitters 208, 234, receivers 212, 232, OMTs 214, 230, linear-to-circular polarizers 222, 228, and antennas 224, 226, which function, respectively, as their correspondingly numbered components and modules of telecommunication system 100 to provide full duplex wireless RF communication over channel 202 between a first site 210, referred to as Site 1, and a second site 213, referred to as Site 2. Channel 202 may be used to transmit signals on forward link 204 using one circular polarization and receive signals on return link 206 using the opposite circular polarization on the same channel bandwidth allocation. Thus, telecommunication system 200 can achieve full duplex communication with frequency re-use using PDD by placing the transmit and receive signals on opposite circular polarizations. Telecommunication system 200 may isolate the desired polarization at the receive end of each link 204 and 206 using, respectively, CPIC 238 and CPIC 236. CPICs 236 and 238 may be used to cancel out the transmitted signal from each site to prevent the transmitted signal from interfering with proper detection of the received signal in the receiver at the same site.

Referring now to FIG. 3, an example of a cross-polarization interference canceller 236 according to one embodiment, connected in a full duplex telecommunication system 200 using PDD, is illustrated using a block diagram. FIG. 3 shows one example configuration of CPIC 236 for preventing transmit signal 240 from interfering with receive signal 242. Antenna 224 and OMT 214 can operate as described above to route transmit signal 240 from transmitter 208 to forward link 204 and to route receive signal 242 from return link 206 to receiver 212.

As seen in FIG. 3, receive splitter 244 may split receive signal 242 so that receive signal 242 is fed simultaneously to summer 246 and to interference detector 248. Transmit splitter 250 may split transmit signal 240 so that transmit signal 240 is fed simultaneously to interference detector 248 and vector modulator 254 of CPIC 236 and to OMT 214 to be transmitted over forward link 204 from antenna 224.

Interference detector 248 can correlate transmit signal 240 and receive signal 242 to determine the amplitude and phase of interference with receive signal 242 due to transmit signal 240. The interference amplitude and interference phase of interference with receive signal 242 due to transmit signal 240 is output by interference detector 248 and may be used by vector modulator controller 252 to calculate new vector modulator settings for vector modulator 254. Vector modulator controller 252 can set vector modulator 254 to cancel out interference on receive signal 242 from transmit signal 240. Vector modulator 254 may use transmit signal 240, which is connected directly to vector modulator 254 from transmit splitter 250, and may use new vector modulator settings from vector modulator controller 252 to form an interference cancellation vector that, when added to receive signal 242, cancels interference with receive signal 242 due to transmit signal 240. Such interference with receive signal 242 due to transmit signal 240 may be caused, for example, by the reflection problem described above. Summer 246 can add the interference cancellation vector from vector modulator 254 to receive signal 242 from receive splitter 244 to provide a clean receive signal 256 to receiver 212.

Figure 4:
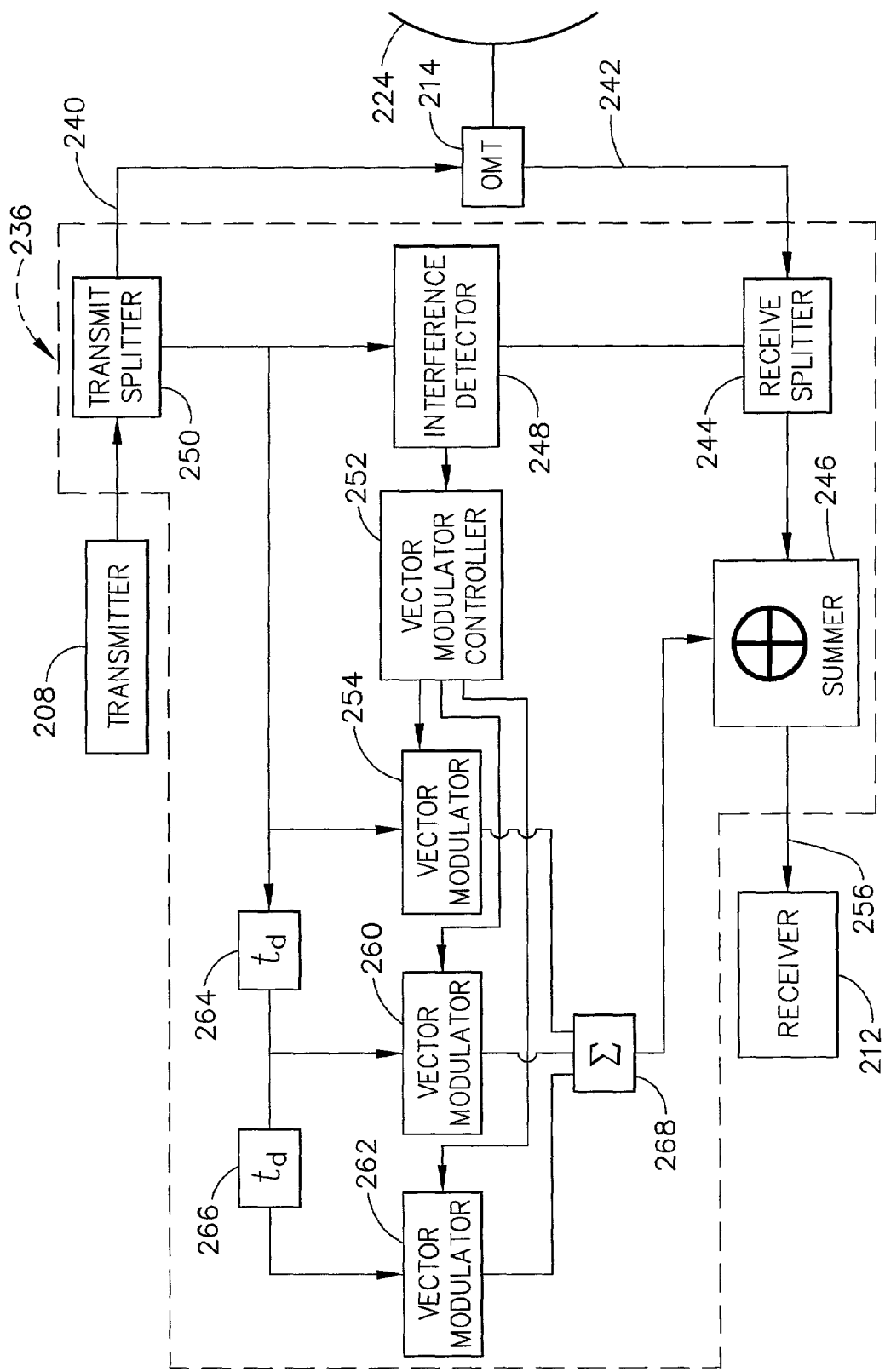
FIG. 4 is a block diagram of a cross-polarization interference canceller with a multi-tap implementation connected in a full duplex telecommunication system using PDD according to one embodiment of the present invention.

Referring now to FIG. 4, an example of a cross-polarization interference canceller 236 with a multi-tap implementation, according to one embodiment, connected in a full duplex telecommunication system 200 using PDD, is illustrated using a block diagram. FIG. 4 shows one example configuration of CPIC 236 for preventing transmit signal 240 from interfering with receive signal 242. Antenna 224 and OMT 214 can operate as described above to route transmit signal 240 from transmitter 208 to forward link 204 and to route receive signal 242 from return link 206 to receiver 212.

As seen in FIG. 4, receive splitter 244 may split receive signal 242 so that receive signal 242 is fed simultaneously to summer 246 and to interference detector 248. Transmit splitter 250 may split transmit signal 240 so that transmit signal 240 is fed simultaneously to interference detector 248, vector modulator 254, time delay element 264, and OMT 214. From OMT 214, transmit signal 240 may be fed to antenna 224 to be transmitted over forward link 204 from antenna 224.

Interference detector 248 can correlate transmit signal 240 and receive signal 242 to determine the amplitude and phase of interference with receive signal 242 due to transmit signal 240. The interference amplitude and interference phase of interference with receive signal 242 due to transmit signal 240 is output by interference detector 248 and may be used by vector modulator controller 252 to calculate new vector modulator settings for vector modulators 254, 260, and 262. Vector modulator 260 may be fed transmit signal 240 after a time delay determined by time delay element 264. Vector modulator 262 may be fed transmit signal 240 after a time delay determined by time delay element 266, in effect after the sum of time delays of time delay element 264 and time delay element 266. Typically, the time delays would be evenly spaced, but need not be. Any desired number of time delay taps and additional vector modulators may be used. The present example shows two additional time delay taps, i.e. time delay elements 264 and 266, and two additional vector modulators, i.e. vector modulators 260 and 262. In the present example, which uses three vector modulators, CPIC 236 simultaneously processes three different temporal portions of transmit signal 240 and receive signal 242. Vector modulator controller 252 may set vector modulators 254, 260, and 262 to cancel out interference on receive signal 242 from transmit signal 240. By computing the residual uncancelled cross polarization dissipation power in the signal bandwidth, signal degradation may be reduced using multiple time delay taps.

Vector modulators 254, 260, and 262 may use transmit signal 240 and new vector modulator settings from vector modulator controller 252 to form interference cancellation vectors that may be added by summer 268 and fed to summer 246 as a total interference cancellation vector. The total interference cancellation vector, when added to receive signal 242 by summer 246, can substantially cancel interference with receive signal 242 due to transmit signal 240 to form clean receive signal 256. Summer 246 can add the total interference cancellation vector from summer 268 to receive signal 242 from receive splitter 244 to provide clean receive signal 256 to receiver 212.

As described above, interference on receive signal 242 from transmit signal 240, which may be cancelled by the total interference cancellation vector, may be caused, for example, by reflection of circularly polarized electromagnetic waves in channel 202. CPIC 236 thus makes practical the use of polarization division duplexing for full duplex communication in wireless communication systems.

It should be understood, of course, that the foregoing relates to preferred embodiments of the invention and that modifications may be made without departing from the spirit and scope of the invention as set forth in the following claims.

We claim:

1. A telecommunication system comprising:
    a transmitter at a site configured to modulate a first radio frequency (RF) carrier with a first set of data to form a transmit signal;
    a receiver at said site configured to demodulate a second set of data from a second RF carrier forming a receive signal;
    an orthomode transducer having at least two linear ports and a circular waveguide port, one of said linear ports connected as an input from said transmitter and another of said linear ports simultaneously connected as an output to said receiver;
    an antenna;
    a linear-to-circular polarizer connected to said circular waveguide port and connected to said antenna, said linear-to-circular polarizer configured so that a first linear polarization at said circular waveguide port results in a first circular polarization at said antenna and a second circular polarization at said antenna results in a second linear polarization at said circular waveguide port; and a cross polarization interference canceller including an interference detector coupled with a transmit splitter and a receive splitter, wherein the interference detector is configured to correlate the transmit signal with the receive signal to determine an interference with said receive signal due to said transmit signal and to output an interference amplitude and interference phase of said interference;

a vector modulator controller configured to use said interference amplitude and interference phase output of said interference detector to calculate new vector modulator settings;

a vector modulator connected to said transmit splitter and connected to said vector modulator controller, said vector modulator configured to use said transmit signal from said transmit splitter and said new vector modulator settings from said vector modulator controller to form an interference cancellation vector; and a summer connected to said vector modulator and connected to said receive splitter, said summer configured to form a clean receive signal by adding said interference cancellation vector from said vector modulator to said receive signal from said receive splitter, said summer adapted to provide said clean receive signal to a receiver.

2. The telecommunication system of claim 1 further comprising:

a second transmitter at a second site configured to modulate said second RF carrier with said second set of data;

a second receiver at said second site configured to demodulate said first set of data from said first RF carrier;

a second orthomode transducer having at least two second linear ports and a second circular waveguide port, one of said second linear ports connected as an input from said second transmitter and another of said second linear ports simultaneously connected as an output to said second receiver;

a second antenna; and a second linear-to-circular polarizer connected to said second circular waveguide port and connected to said second antenna, said second linear-to-circular polarizer configured so that said second linear polarization at said second circular waveguide port results in said second circular polarization at said second antenna and said first circular polarization at said second antenna results in said first linear polarization at said second circular waveguide port.

3. The telecommunication system of claim 1 wherein said first RF carrier and said second RF carrier have the same frequency.

4. The telecommunication system of claim 1 wherein said first RF carrier at said site has said first circular polarization and said second RF carrier at said site has said second circular polarization.

5. The telecommunication system of claim 1 wherein said first circular polarization is left-hand circular polarization (LHCP) and said second circular polarization is right-hand circular polarization (RHCP).

6. The telecommunication system of claim 1 wherein said first circular polarization is right-hand circular polarization (RHCP) and said second circular polarization is left-hand circular polarization (LHCP).

7. The telecommunication system of claim 1 wherein said first linear polarization is horizontal and said second linear polarization is vertical.

8. The telecommunication system of claim 1 wherein said first linear polarization is vertical and said second linear polarization is horizontal.

9. A cross polarization interference canceller comprising:

a transmit splitter adapted for splitting a transmit signal between a forward link and said cross polarization interference canceller;

a receive splitter adapted for splitting a receive signal from a return link;

an interference detector connected to said transmit splitter and connected to said receive splitter and configured to correlate said transmit signal and said receive signal to determine an interference with said receive signal due to said transmit signal and to output an interference amplitude and interference phase of said interference;

a vector modulator controller configured to use said interference amplitude and interference phase output of said interference detector to calculate new vector modulator settings;

a vector modulator connected to said transmit splitter and connected to said vector modulator controller, said vector modulator configured to use said transmit signal from said transmit splitter and said new vector modulator settings from said vector modulator controller to form an interference cancellation vector; and a summer connected to said vector modulator and connected to said receive splitter, said summer configured to form a clean receive signal by adding said interference cancellation vector from said vector modulator to said receive signal from said receive splitter, said summer adapted to provide said clean receive signal to a receiver.

10. The cross polarization interference canceller of claim 9 wherein said interference cancellation vector substantially cancels said interference with said receive signal due to said transmit signal when said interference cancellation vector is added to said receive signal.

11. The cross polarization interference canceller of claim 9 wherein said transmit signal and said receive signal have the same frequency.

12. The cross polarization interference canceller of claim 9 wherein said forward link and said return link are transmitted on a same channel.

13. The cross polarization interference canceller of claim 9 wherein said transmit signal propagates over said forward link with a first circular polarization and said receive signal propagates over said return link with a second circular polarization.

14. The cross polarization interference canceller of claim 13 wherein said first circular polarization is left-hand circular polarization (LHCP) and said second circular polarization is right-hand circular polarization (RHCP).

15. The cross polarization interference canceller of claim 13 wherein said first circular polarization is right-hand circular polarization (RHCP) and said second circular polarization is left-hand circular polarization (LHCP).

16. A telecommunication system comprising:

a transmitter at a first site configured to modulate a first radio frequency (RF) carrier with a first set of data to form a transmit signal;

a receiver at said first site configured to demodulate a second set of data from a second RF carrier forming a receive signal;

an orthomode transducer having at least two linear ports and a circular waveguide port, one of said linear ports connected as an input from said transmitter and another of said linear ports simultaneously connected as an output to said receiver;

an antenna;

a linear-to-circular polarizer connected to said circular waveguide port and connected to said antenna, said linear-to-circular polarizer configured so that a first linear polarization at said circular waveguide port results in a first circular polarization at said antenna and a second circular polarization at said antenna results in a second linear polarization at said circular waveguide port; and a cross polarization interference canceller comprising:

a transmit splitter adapted for splitting said transmit signal between said orthomode transducer and said cross polarization interference canceller;

a receive splitter adapted for splitting said receive signal from said orthomode transducer;

an interference detector connected to said transmit splitter and connected to said receive splitter and configured to correlate said transmit signal and said receive signal to determine an interference with said receive signal due to said transmit signal and to output an interference amplitude and interference phase of said interference;

a vector modulator controller configured to use said interference amplitude and interference phase output of said interference detector to calculate new vector modulator settings;

a vector modulator connected to said transmit splitter and connected to said vector modulator controller, said vector modulator configured to use said transmit signal from said transmit splitter and said new vector modulator settings from said vector modulator controller to form an interference cancellation vector, wherein said interference cancellation vector substantially cancels interference on said receive signal from said transmit signal when said interference cancellation vector is added to said receive signal; and a summer connected to said vector modulator and connected to said receive splitter, said summer configured to form a clean receive signal by adding said interference cancellation vector from said vector modulator to said receive signal from said receive splitter, wherein said summer provides said clean receive signal to said receiver.

17. The telecommunication system of claim 16 further comprising a second transmitter and a second receiver at a second site, said second transmitter and said second receiver configured to communicate with said first receiver and said first transmitter at said first site.

18. A method comprising steps of:

modulating a first radio frequency (RF) carrier with a first set of data to form a transmit signal wherein said modulating is performed by a transmitter;

demodulating a second set of data from a second RF carrier forming a receive signal, wherein said demodulating is performed by a receiver;

simultaneously using one linear port of an orthomode transducer having at least two linear ports as an input from said transmitter and another linear port of said orthomode transducer as an output to said receiver while using a circular waveguide port of said orthomode transducer as input and output to a channel;

converting a first linear polarization at said circular waveguide port to a first circular polarization in said channel and converting a second circular polarization in said channel to a second linear polarization at said circular waveguide port;

splitting said transmit signal between said orthomode transducer and a cross polarization interference canceller;

splitting said receive signal from said orthomode transducer;

feeding said transmit signal and said receive signal to an interference detector and using said interference detector to correlate said transmit signal and said receive signal to determine an interference with said receive signal due to said transmit signal and to output an interference amplitude and interference phase of said interference;

inputting said interference amplitude and interference phase to a vector modulator controller to calculate new vector modulator settings;

supplying said new vector modulator settings to a vector modulator and using said transmit signal and said new vector modulator settings from said vector modulator controller to form an interference cancellation vector, wherein said interference cancellation vector substantially cancels interference with said receive signal due to said transmit signal when said interference cancellation vector is added to said receive signal;

using a summer to add said interference cancellation vector from said vector modulator to said receive signal to form a clean receive signal; and providing said clean receive signal to said receiver whereby cross polarization interference is substantially cancelled.

19. The method of claim 18 wherein said first RF carrier and said second RF carrier have the same frequency.

20. The method of claim 18 wherein said converting step is performed by a linear-to-circular polarizer.

21. The method of claim 18 wherein said channel is accessed using an antenna.

22. The method of claim 20 wherein said linear-to-circular polarizer is connected to an antenna.

23. The method of claim 18 wherein said first circular polarization is right-hand circular polarization (RHCP) and said second circular polarization is left-hand circular polarization (LHCP).

24. The method of claim 18 wherein said first circular polarization is left-hand circular polarization (LHCP) and said second circular polarization is right-hand circular polarization (RHCP).

25. The method of claim 18 wherein said first linear polarization is horizontal and said second linear polarization is vertical.

26. The method of claim 18 wherein said first linear polarization is vertical and said second linear polarization is horizontal.

27. The method of claim 18 wherein said first linear polarization and said second linear polarization are orthogonal to each other.

* * * * *